(12) United States Patent
Claessens et al.

(10) Patent No.: US 9,678,279 B2
(45) Date of Patent: Jun. 13, 2017

(54) SYSTEM AND METHOD FOR MOUNTING BLOWN FIBER TUBES TO A HOUSING

(71) Applicant: TYCO ELECTRONICS RAYCHEM BVBA, Kessel-Lo (BE)

(72) Inventors: Bart Mattie Claessens, Hasselt (BE); Dirk Kempeneers, Aarschot (BE); Wouter Foulon, Leuven (BE); Vince Wellens, Diest (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 171 days.

(21) Appl. No.: 14/360,188

(22) PCT Filed: Nov. 20, 2012

(86) PCT No.: PCT/EP2012/073054
§ 371 (c)(1),
(2) Date: May 22, 2014

(87) PCT Pub. No.: WO2013/076054
PCT Pub. Date: May 30, 2013

(65) Prior Publication Data
US 2014/0304970 A1    Oct. 16, 2014

Related U.S. Application Data

(60) Provisional application No. 61/562,783, filed on Nov. 22, 2011, provisional application No. 61/651,685, (Continued)

(51) Int. Cl.
*G02B 6/44* (2006.01)
*G02B 6/36* (2006.01)
(Continued)

(52) U.S. Cl.
CPC ............ *G02B 6/36* (2013.01); *G02B 6/4444* (2013.01); *H02G 3/0691* (2013.01);
(Continued)

(58) Field of Classification Search
CPC .. Y10T 29/49913; G02B 6/36; G02B 6/4471; G02B 6/44
See application file for complete search history.

(56) References Cited

U.S. PATENT DOCUMENTS 5,455,391 A   10/1995 Demesmaeker et al.
5,775,702 A   7/1998 Laeremans et al.
(Continued)

FOREIGN PATENT DOCUMENTS

EP   0646294   6/1996
EP   0646295   12/1996
(Continued)

OTHER PUBLICATIONS

International Search Report for International Application No. PCT/EP2012/073054 mailed Jun. 13, 2013 (2 pages).

*Primary Examiner* — Jason L Vaughan
*Assistant Examiner* — Amanda Meneghini
(74) *Attorney, Agent, or Firm* — Merchant & Gould P.C.

(57) ABSTRACT

An apparatus (10) for mounting blown fiber tubes (20) includes a main housing (40) mountable to an end (32) of a flex tube (30), an outer ring (50) positioned at an end (42) of the main housing (40), and an inner ring (60) positioned adjacent to and within the outer ring (50) wherein the blown fiber tubes (20) are positioned about an outer periphery (62) of the inner ring (60). A trigger (70) pushes the inner ring (60) to compress the blown fiber tubes (20) between the inner ring (60) and the outer ring (50). The outer ring (500 and the inner ring (60) each include a plurality of spaced pockets (52, 68) each sized for receipt of a blown fiber tube (Continued)

(20). The trigger (70) includes a threaded member (80) which pushes the inner ring (60) outwardly. In one embodiment, portions (64) of the inner ring (60) separate during activation and press against the blown fiber tubes (20) to compress the blown fiber tubes (20) against the outer ring (50). A spring (496) may be added to push on the inner ring (60). Anti-rotation and lock features are provided for the compression, sealing and fixation mechanisms.

16 Claims, 23 Drawing Sheets

Related U.S. Application Data filed on May 25, 2012, provisional application No. 61/669,506, filed on Jul. 9, 2012.

(51) Int. Cl.
*H02G 3/06* (2006.01)
*H02G 3/08* (2006.01)

(52) U.S. Cl.
CPC ........... *H02G 3/083* (2013.01); *G02B 6/4464* (2013.01); *G02B 6/4471* (2013.01); *Y10T 29/49826* (2015.01); *Y10T 29/5367* (2015.01)

(56) References Cited

U.S. PATENT DOCUMENTS

| | | |
|---|---|---|
| 5,814,770 A | 9/1998 | Pieck et al. |
| 5,883,333 A | 3/1999 | Wambeke et al. |
| 6,051,792 A | 4/2000 | Damm et al. |
| 6,150,608 A | 11/2000 | Wambeke et al. |
| 2010/0034507 A1 | 2/2010 | Sielaff |
| 2012/0235363 A1* | 9/2012 | Vanhentwnrijk .... G02B 6/4444 277/627 |

FOREIGN PATENT DOCUMENTS

| | | |
|---|---|---|
| EP | 2 330 707 | 6/2011 |
| FR | 2 662 270 | 11/1991 |
| WO | WO 9609671 | 3/1996 |
| WO | WO 96/24185 | 8/1996 |

* cited by examiner

SYSTEM AND METHOD FOR MOUNTING BLOWN FIBER TUBES TO A HOUSING

This application is a National Stage Application of PCT/EP2012/073054, filed 20 Nov. 2012, which claims benefit of U.S. Provisional Ser. No. 61/562,783, filed 22 Nov. 2011, U.S. Provisional Ser. No. 61/651,685, field 25 May 2012, and U.S. Provisional Ser. No. 61/669,506, filed 9 Jul. 2012 and which applications are incorporated herein by reference. To the extent appropriate, a claim of priority is made to each of the above disclosed applications.

TECHNICAL FIELD

The present invention relates to systems and methods for mounting blown fiber tubes to a housing, such as a housing mounted to a port of a telecommunications enclosure.

BACKGROUND OF THE INVENTION

Cables enter telecommunications boxes, and enclosures, or other devices through ports or other openings. Some telecommunications systems include tubes which are passed into the telecommunications devices for later use and installation of fibers through the tubes in an air blown fiber installation process. Typically, these tubes are provided within a conduit or duct. There is a need to fix the tubes relative to the port.

SUMMARY OF THE INVENTION

One aspect of the present invention relates to an apparatus for mounting blown fiber tubes to a housing including a main housing mountable to an end of a flex tube, and a mechanism for clamping the tubes to the main housing. The mechanism includes an outer ring positioned at an end of the main housing, and a inner ring positioned adjacent to and within the outer ring wherein the blown fiber tubes are positioned about an outer periphery of the inner ring. A trigger pushes the inner ring to compress the blown fiber tubes between the inner ring and the outer ring.

A further aspect of the present invention relates to providing the outer ring with a plurality of spaced pockets sized to receive the blown fiber tubes.

A still further aspect of the present invention relates to providing the inner ring with a plurality of spaced pockets sized to receive the blown fiber tubes.

In one preferred embodiment, the pockets of the inner ring include at least one protrusion.

In one preferred embodiment, the inner ring includes radial slots between the plurality of spaced pockets.

In a still further preferred embodiment, the inner ring includes outer portions which separate from an inner portion when the trigger moves.

One preferred trigger includes first and second threaded members, wherein the first threaded member includes a surface angled with respect to a longitudinal axis of the apparatus, and the inner ring includes a mating angled surface which pushes the inner ring outwardly.

Another preferred trigger includes a first slideable member which includes an angled surface to mate with the inner ring. A first threaded member is threadably mounted to a second threaded member. A spring is positioned between the second threaded member and the first slideable member.

A preferred arrangement includes mounting the main housing to a port for passing cables through the blown fiber tubes through the port. In one preferred arrangement, the port is part of the enclosure for passing cable through the blown fiber tubes into an interior of the enclosure.

A further aspect of the present invention relates to positioning a plurality of blown fiber tubes about an outer periphery of an inner member, and expanding the inner member outwardly to compress the blown fiber tubes against an outer member.

One preferred method includes providing the inner member with outer portions which separate during activation of trigger to press outwardly against the blown fiber tubes.

A preferred method includes providing pockets for the inner and outer members which are sized to receive to individually receive a blown fiber tube.

Another preferred method includes providing radial slots between the pockets.

One preferred implementation includes providing anti-rotation features between the activation elements for activating the seal and fixation of the tubes.

A further aspect of the present invention includes a locking mechanism between the activation elements for activating the seal and fixation of the tubes.

A further aspect of the present invention includes a trigger which clicks into place to seal and fixate the tubes with a clear indication to the user when the sealing and fixation has occurred.

DETAILED DESCRIPTION

Figure 1:
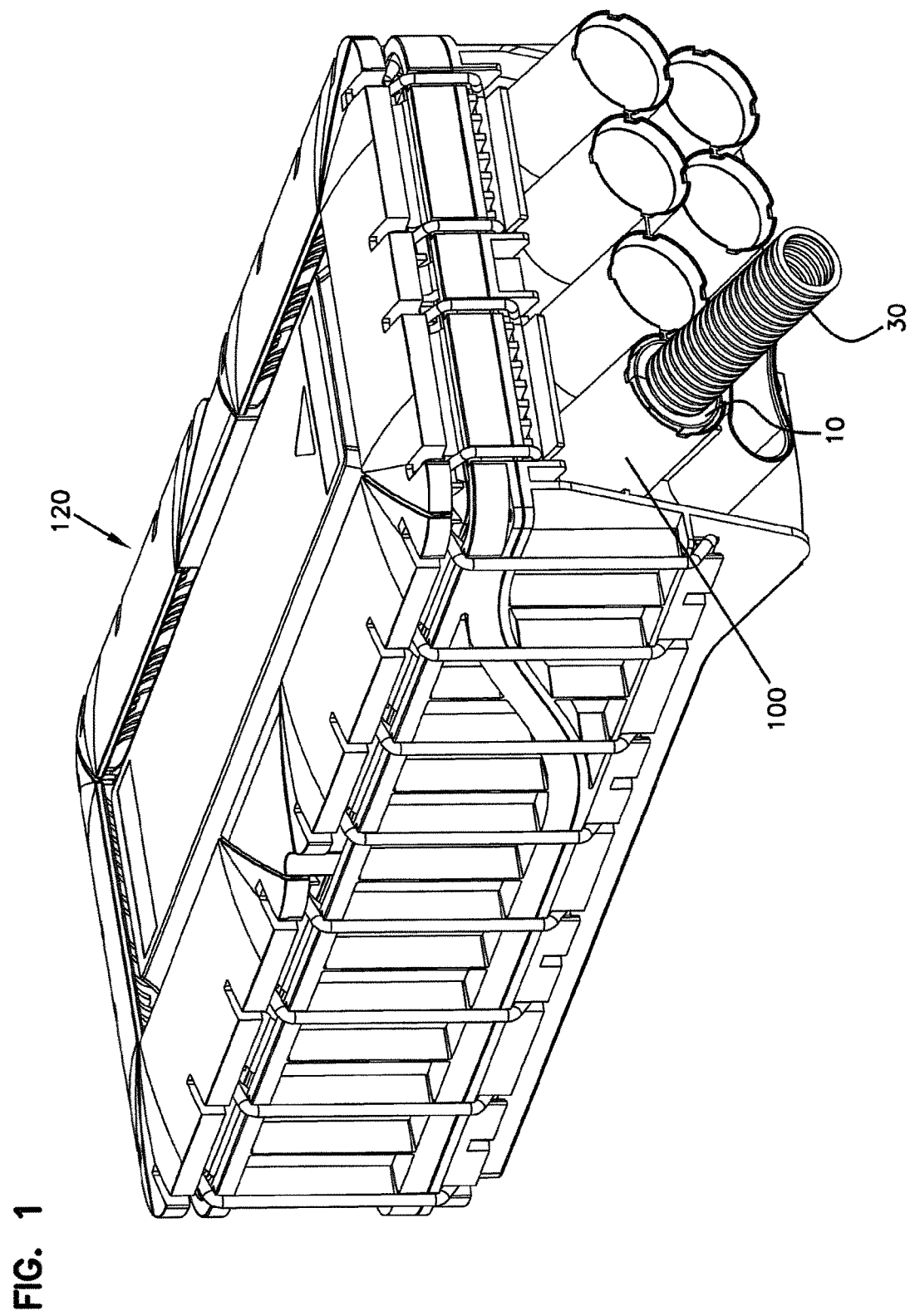
FIG. 1 is a perspective view showing a flex tube mounted to an enclosure at a port wherein the mounting arrangement includes a fixation mechanism for mounting the blown fiber tubes contained within the flex port to a housing mounted to the port.
Figure 2:
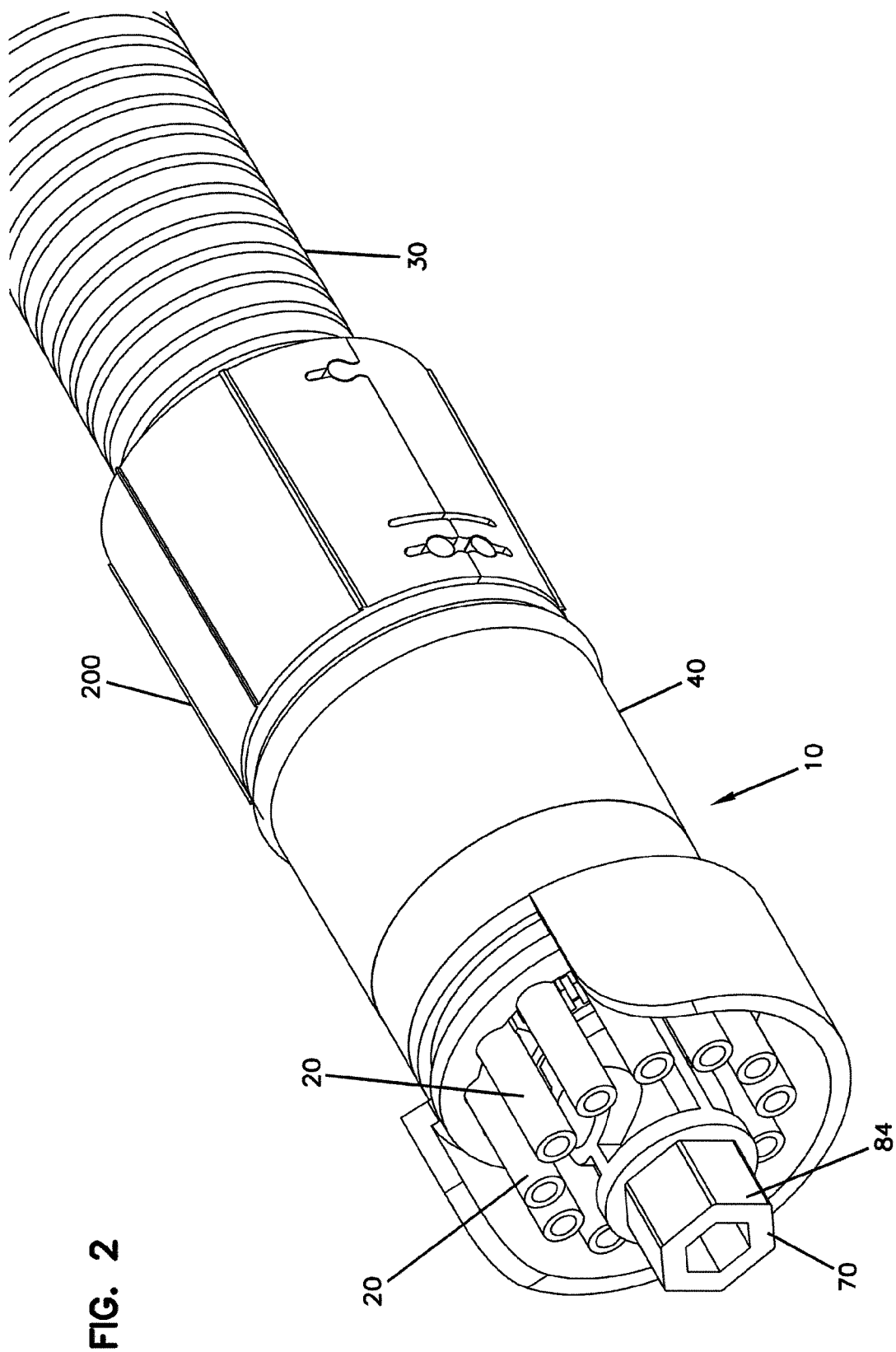
FIG. 2 is a perspective view of the apparatus for mounting blown fiber tubes to a housing which is mountable to the port of FIG. 1.
Figure 3:
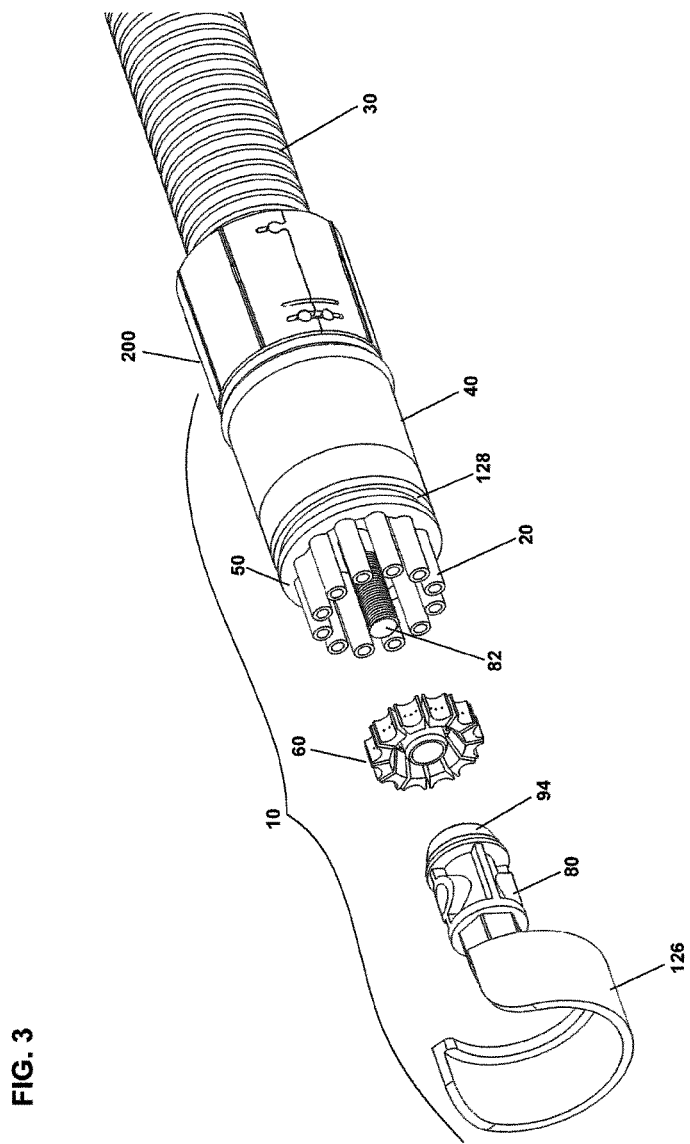
FIG. 3 is an exploded view of the device shown in FIG. 2.
Figure 4:
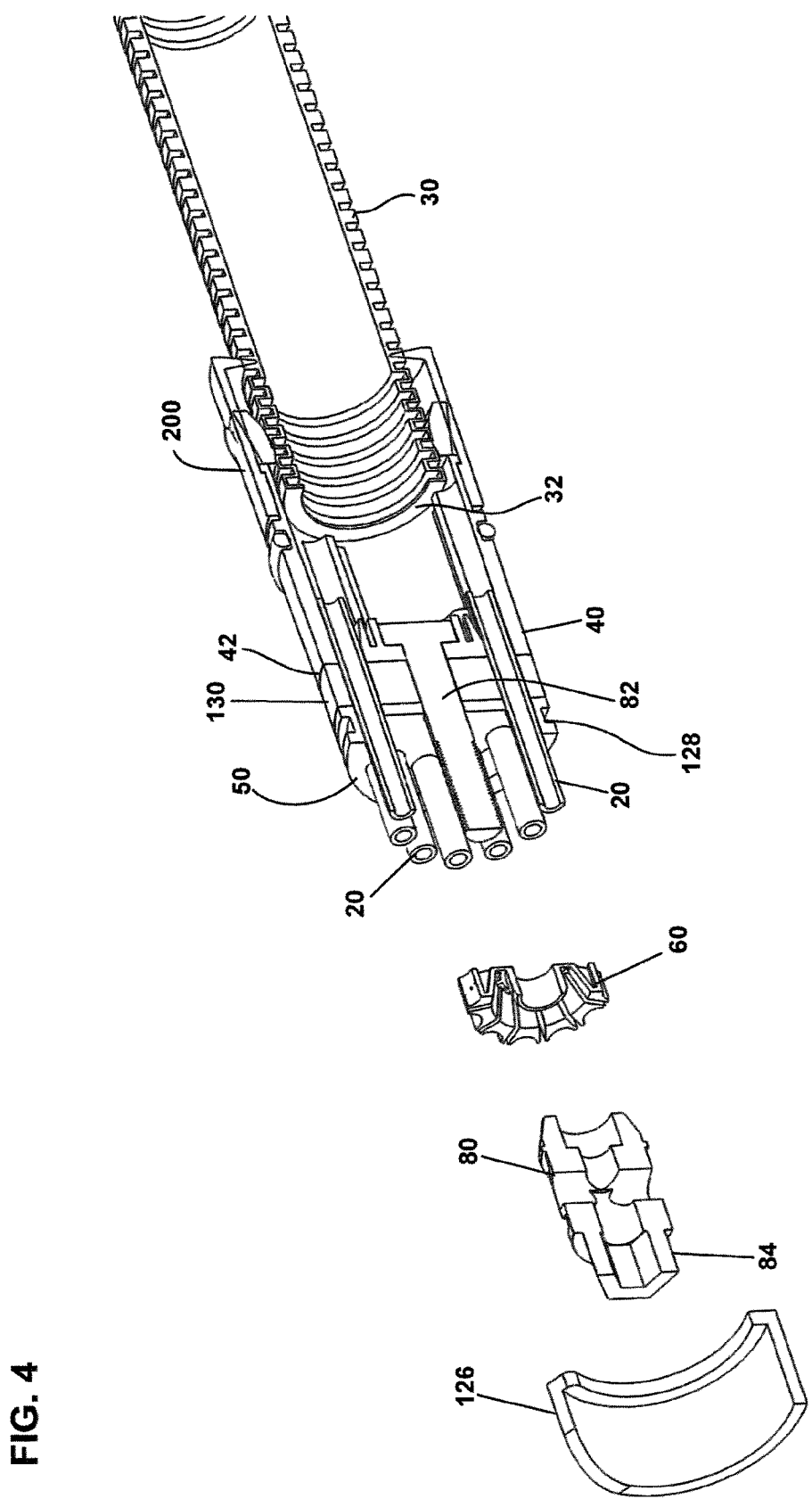
FIG. 4 is a cross-sectional exploded view of the view shown in FIG. 3.
Figure 5:
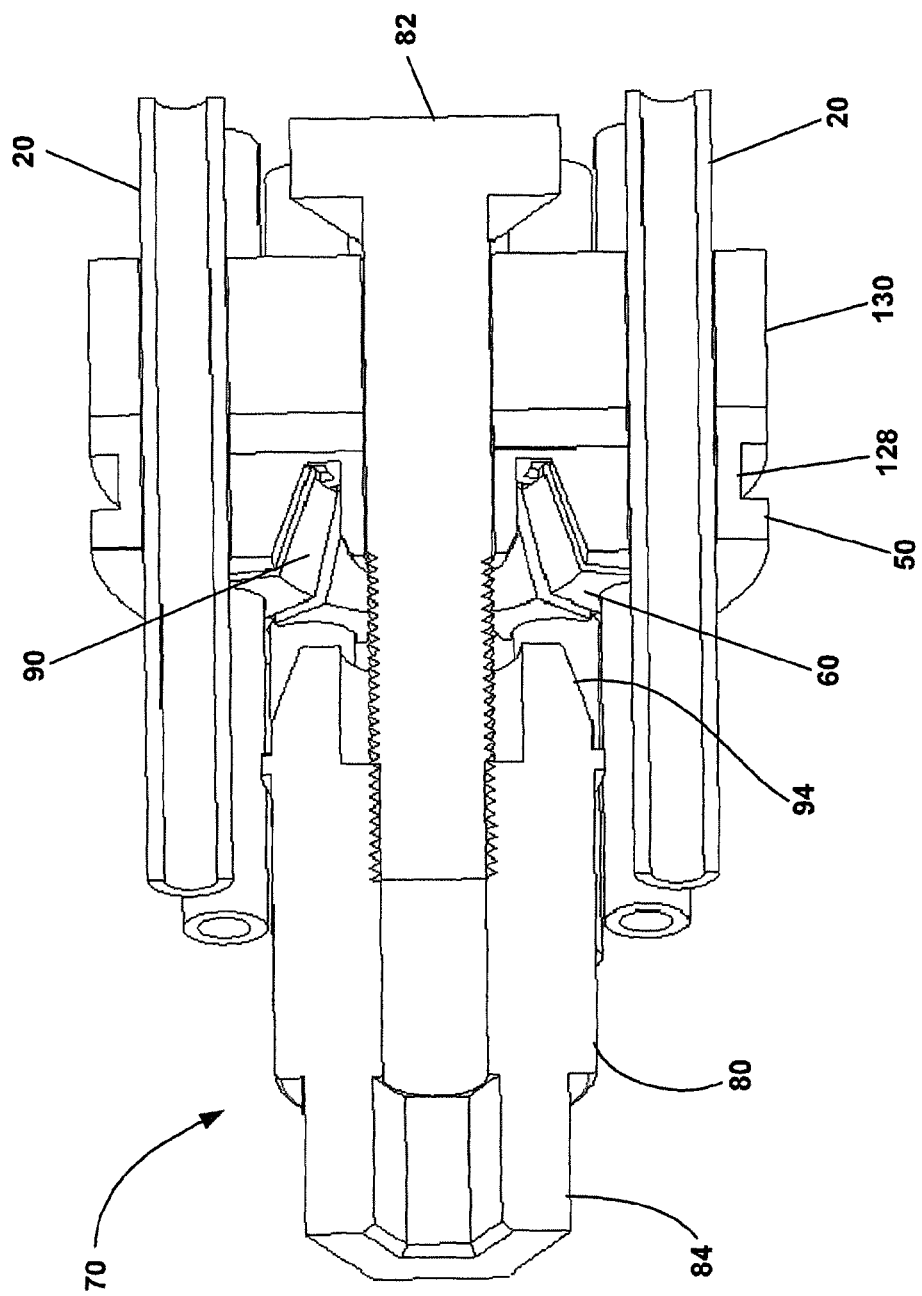
FIG. 5 is a further cross-sectional view of the inner and outer members, the trigger mechanism, the seal, and the blown fiber tubes.
Figure 6:
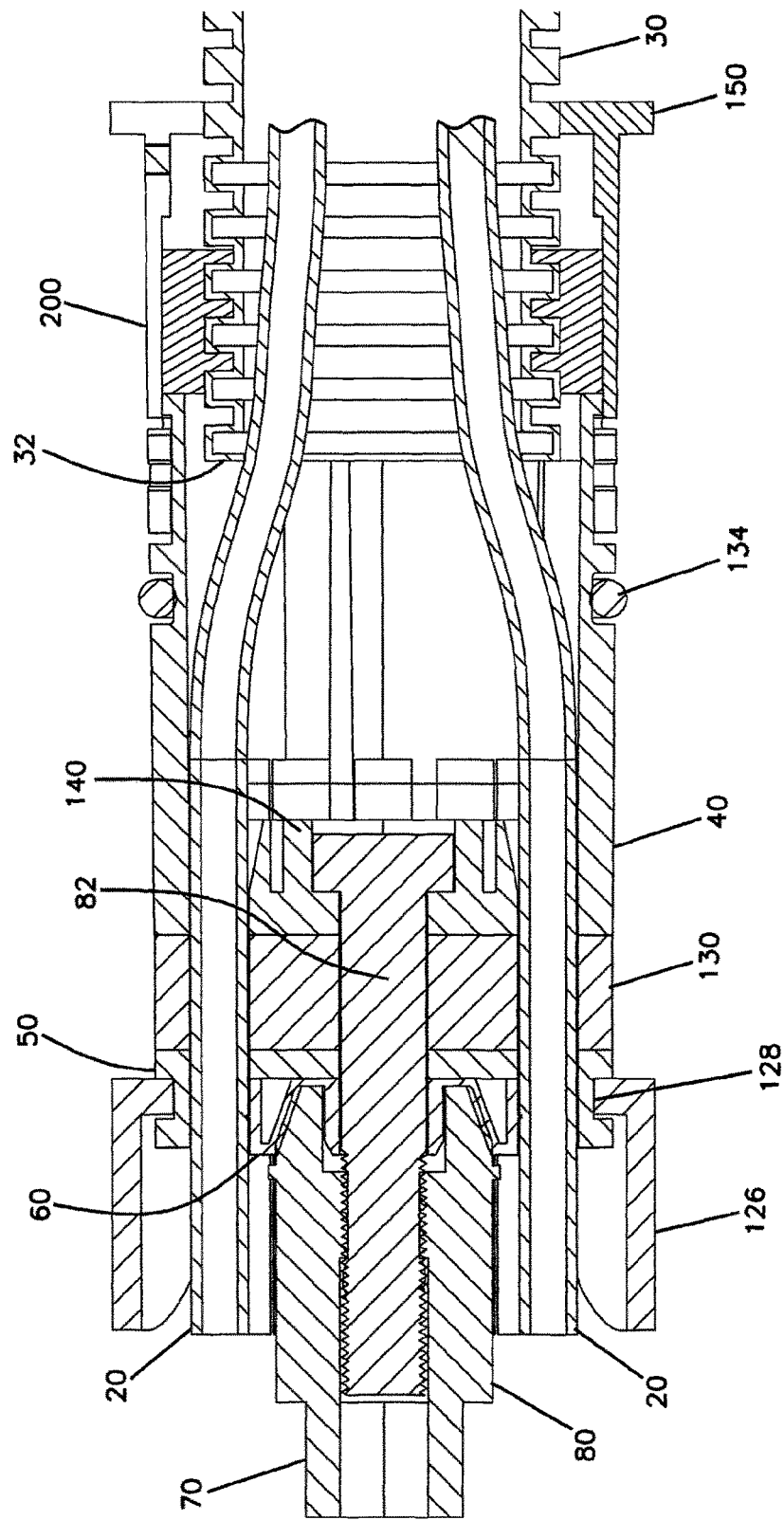
FIG. 6 is a further cross-sectional side view showing the mechanism activated for fixing the blown fiber tubes to the main housing for attachment to a port of an enclosure.
Figure 7:
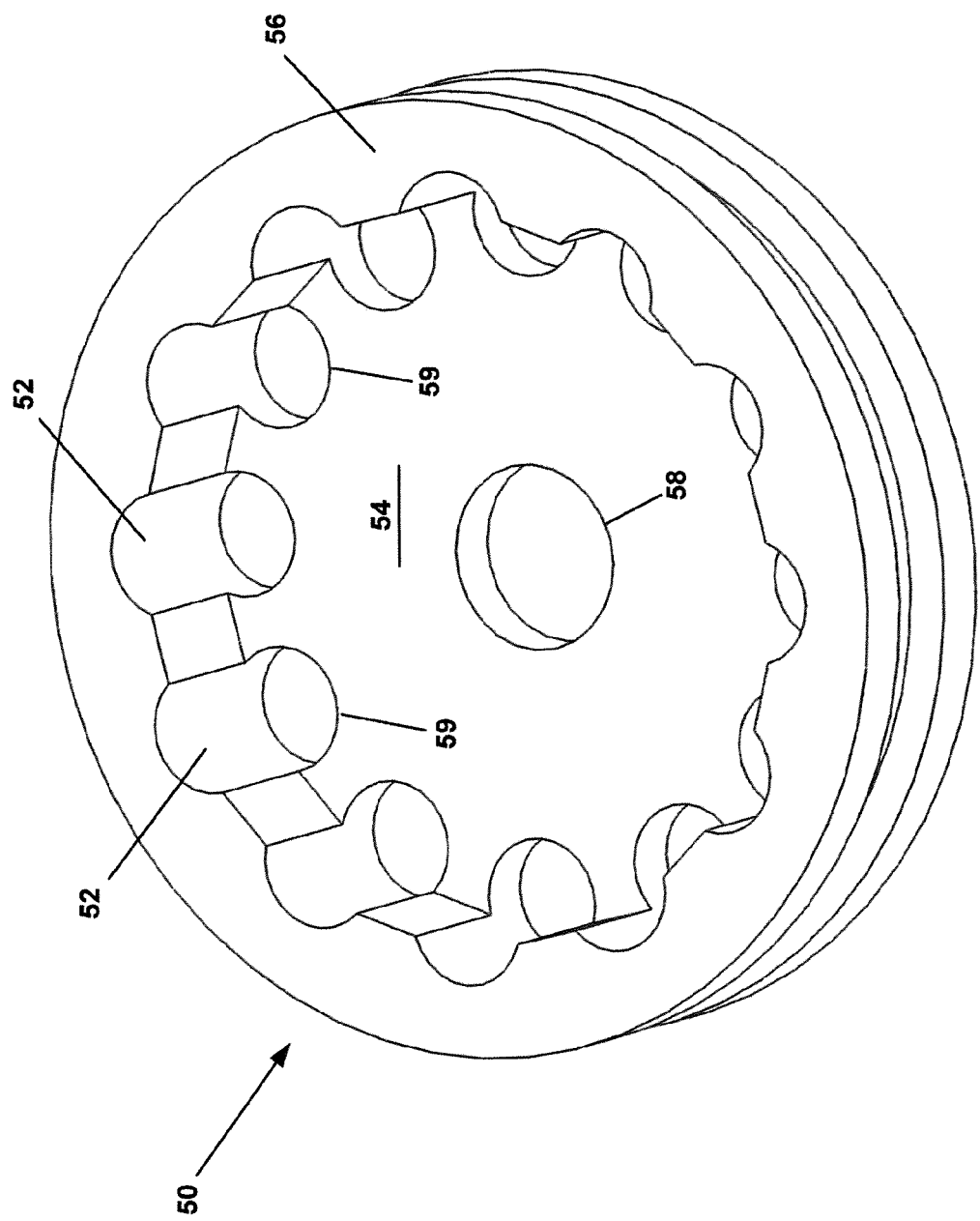
FIG. 7 is a perspective view of the outer ring.
Figure 8:
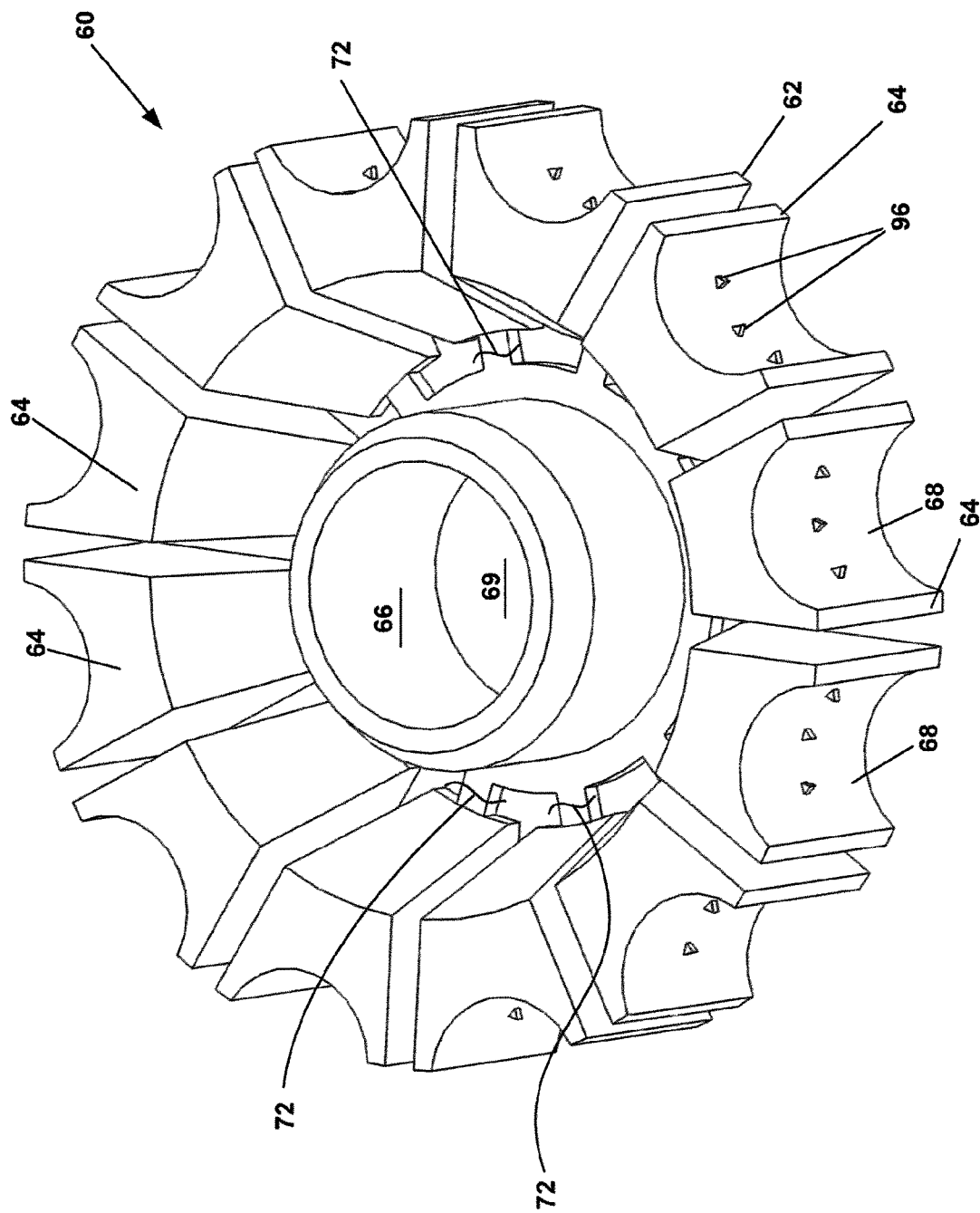
FIG. 8 is a perspective view of the inner ring.
Figure 9:
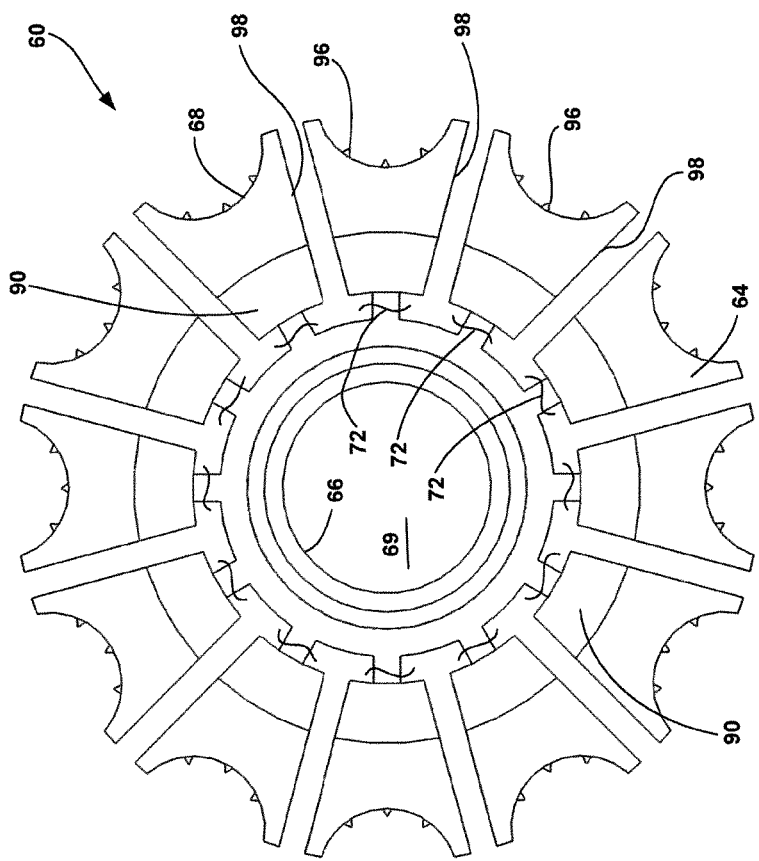
FIG. 9 is an end view of the inner ring.

Referring now to FIGS. 1-9, an apparatus 10 is shown for mounting blown fiber tubes 20 contained within a flex tube 30 to a main housing 40 which is mountable to a port 100 of an enclosure 120. Fiber tubes 20 extend past an end 32 of flex tube 30. Main housing 40 can be mounted to other structures instead of enclosure 120, or other ports 100.

Apparatus 10 includes an outer ring 50 with concave pockets 52 for receiving a blown fiber tube 20 in each pocket. Outer ring 50 includes a base 54 and an outer lip 56. A center hole 58 allows receipt a trigger 70. Pockets 52 and outer lip 56 form holes 59 through base 54.

Inner ring 60 includes an outer periphery 62 and includes a plurality of concave pockets 68 each sized to receive a blown fiber tube. Inner ring 60 also includes a center hole 69 for receipt of the trigger 70.

In the preferred embodiment, as the trigger 70 is activated, inner ring 60 moves outwardly to compress the blown fiber tubes 20 against outer ring 50.

In one preferred implementation, inner ring 60 includes outer portion 64 which separate from inner portion 66 along break lines 72.

Trigger 70 includes a socket 80 and a bolt 82 which are threadably engaged with one another. During activation, socket 80 is rotated via head 84 which draws bolts 82 further into socket 80. Mating angled surfaces 90, 94 cause inner ring 60 to move outwardly and to compress against a seal 130, such as one made from rubber or silicone. Seal 130 seals around tubes 20. Seal 130 is disk shaped and includes a plurality of holes 132 for the tubes 20.

Protrusions 96 in pockets 68 improve fixation of apparatus 10 to blown fiber tubes 20. Slots 98 and break lines 72 allow for outer portions 64 to move outwardly toward outer ring 50 during use.

A C-clip 126 mounts apparatus 10 to port 100 once apparatus is inserted into port 100. C-clip 126 is inserted into groove 128 to retain apparatus 10 in port 100.

An O-ring 134 can be provided to seal an exterior of apparatus 10 at port 100. A flange 150 on apparatus 10 keeps main housing 40 from being inserted too far into port 100.

Bolt 82 is retained by inner housing portion 140 of main housing 40 from turning. Preferably, inner housing portion 140 also retains bolt 82 from axial movement before attachment of socket 80 of trigger 70.

Figure 10:
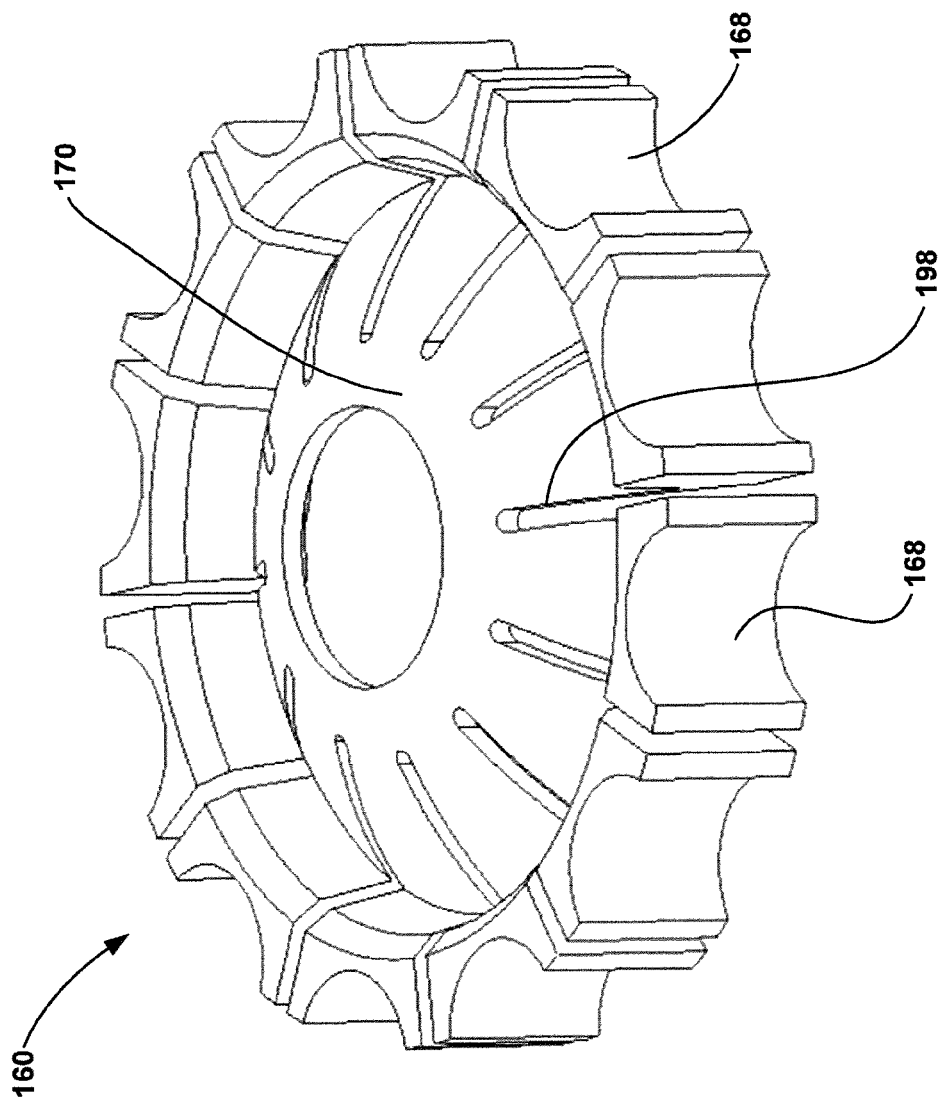
FIG. 10 is a perspective view of an alternative embodiment of an inner ring.

Referring now to FIG. 10, an alternative embodiment of an inner ring 160 is shown including outer pockets 168. A dome shaped middle 170 and slots 198 allow for pockets 168 to move outwardly as the dome shaped middle 170 is compressed.

During operation, inner ring 60, 160 is caused to move outward along its outer periphery to compress against blown fiber tubes 20.

Inner ring 60, 160, outer ring 50, trigger 70 and housing 40 can be made from molded plastic parts. Seal 130 is made from a softer material.

Apparatus 10 includes a flex tube seal and attachment arrangement 200 which attaches main housing 40 to flex tube 30 and also provides a sealing function.

Figure 12:
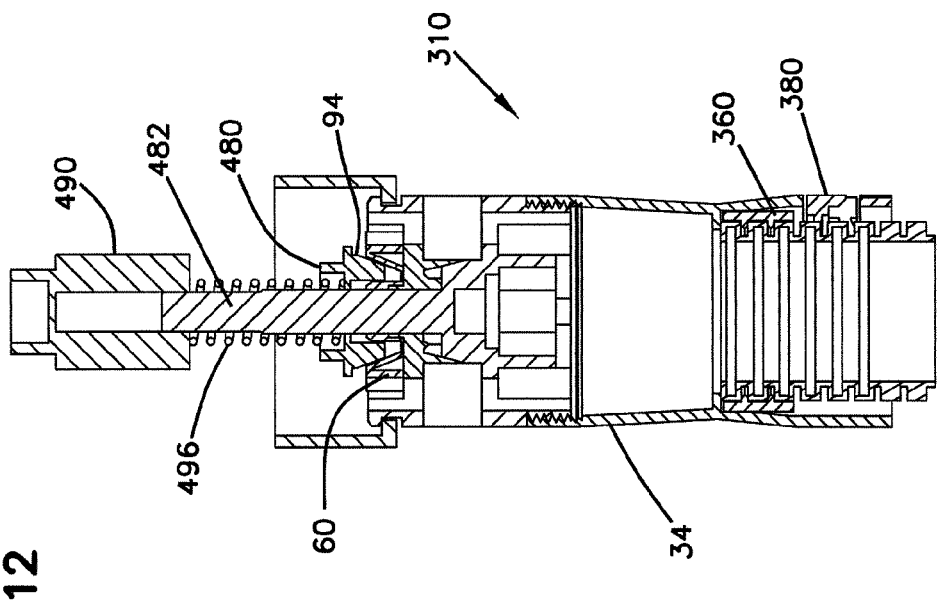
FIG. 12 is a cross-sectional side view of the fixation mechanism of FIG. 11.
Figure 11:
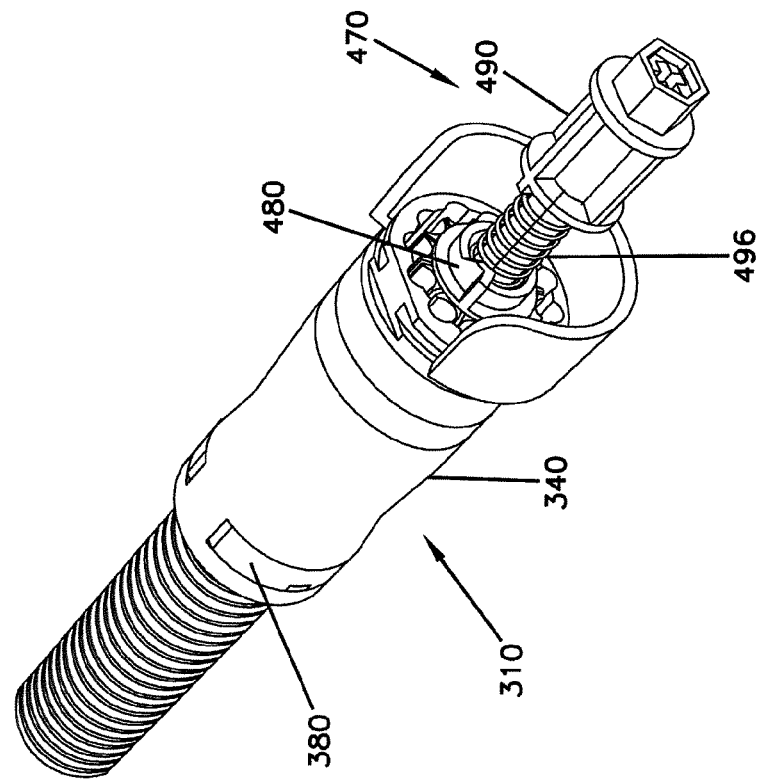
FIG. 11 is a perspective view of an alternative fixation mechanism for mounting the blown fiber tubes contained within the flex port to a housing mounted to the port.
Figure 13:
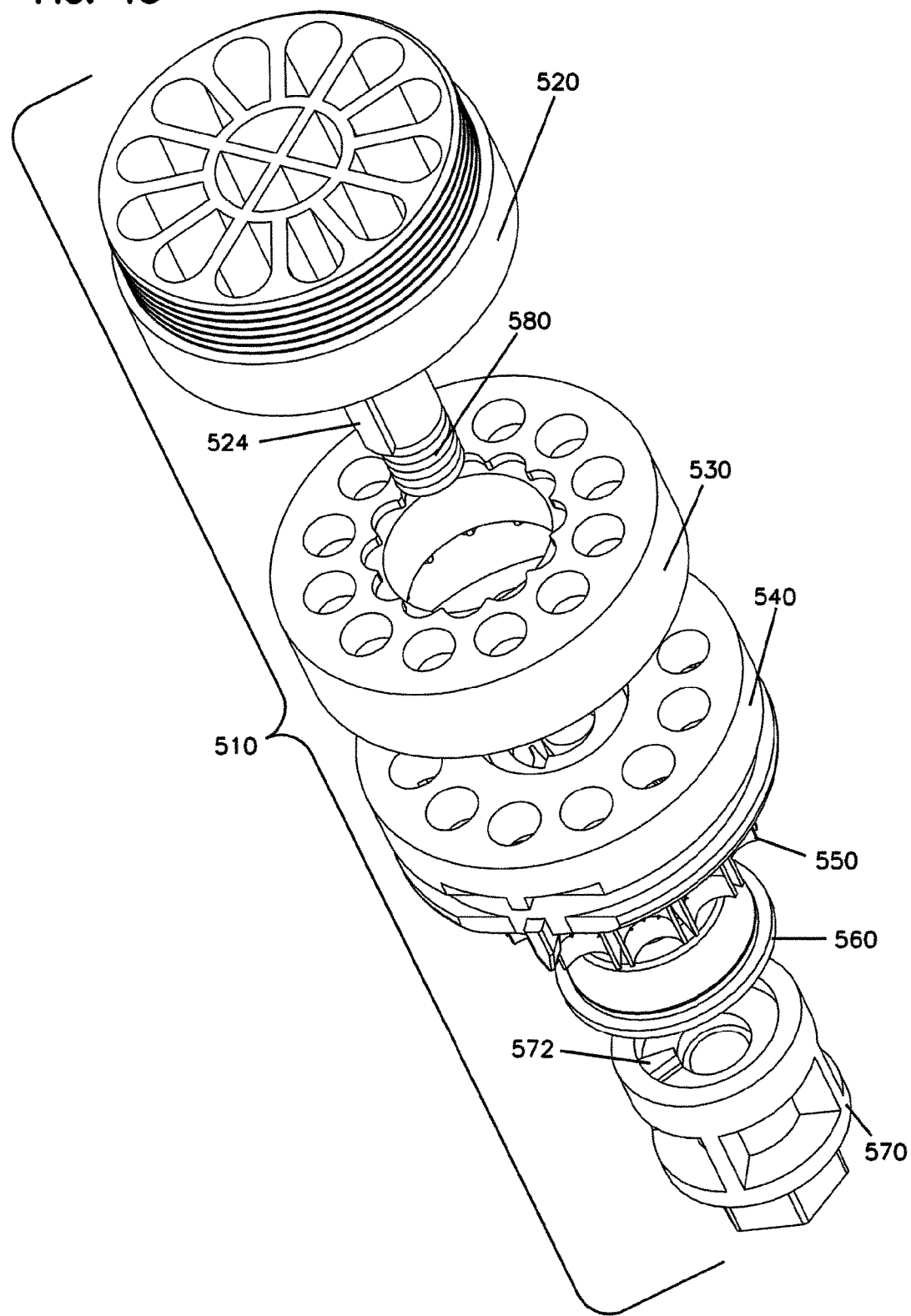
FIG. 13 shows an exploded view of a fixation mechanism in accordance with another embodiment of the present invention.
Figure 14:
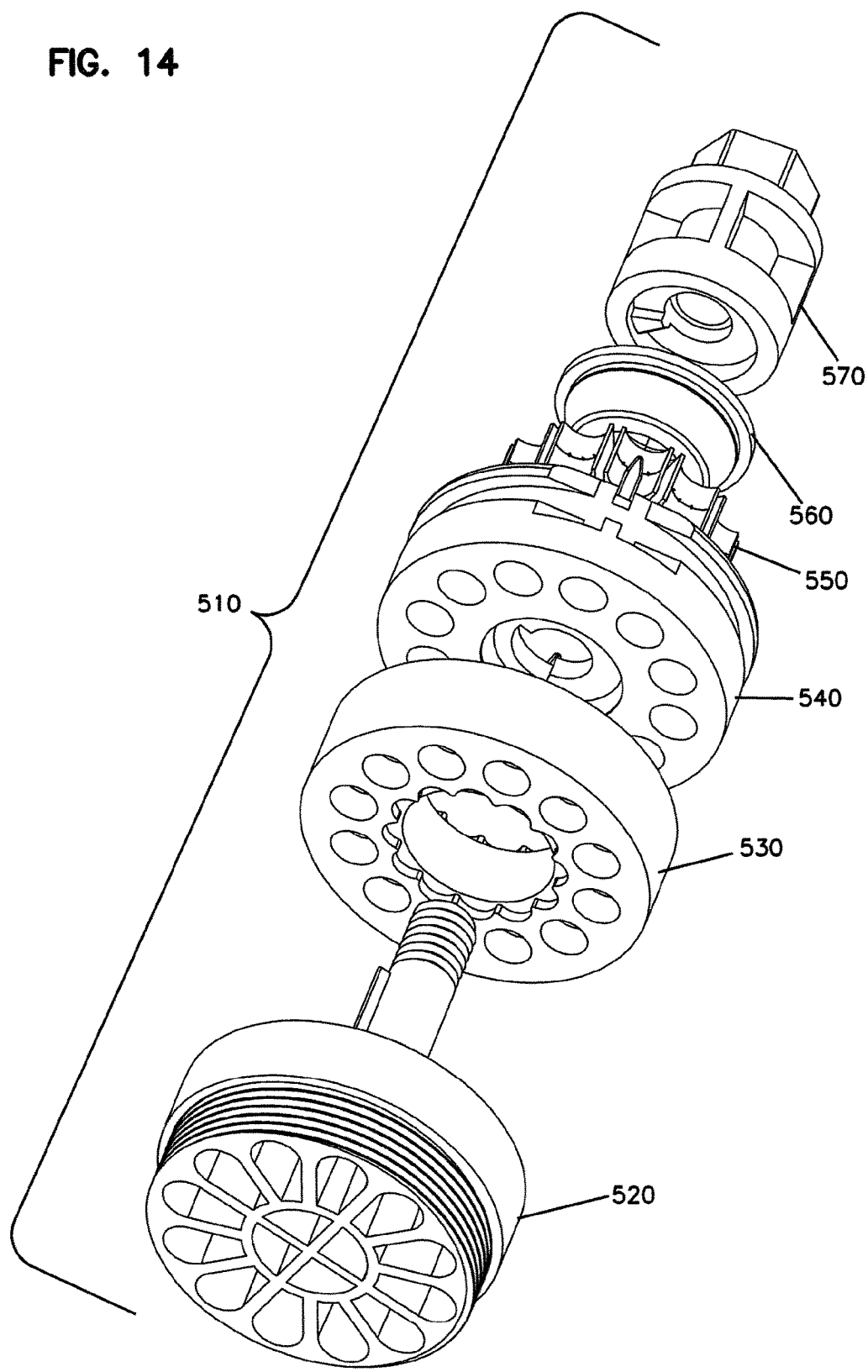
FIG. 14 shows another exploded view of the fixation mechanism of FIG. 13.
Figure 15:
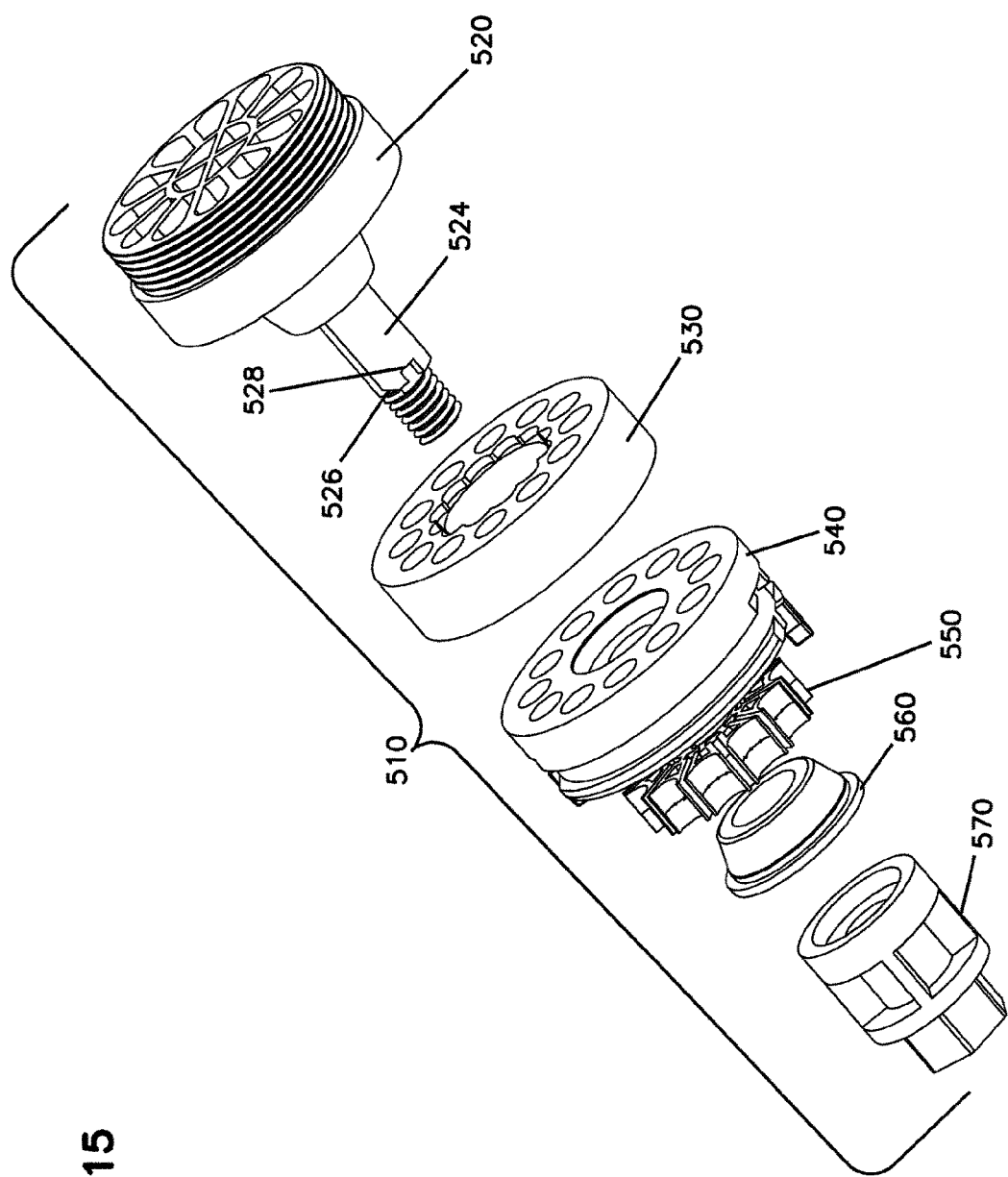
FIG. 15 shows another exploded view of the fixation mechanism of FIG. 13.
Figure 15A:
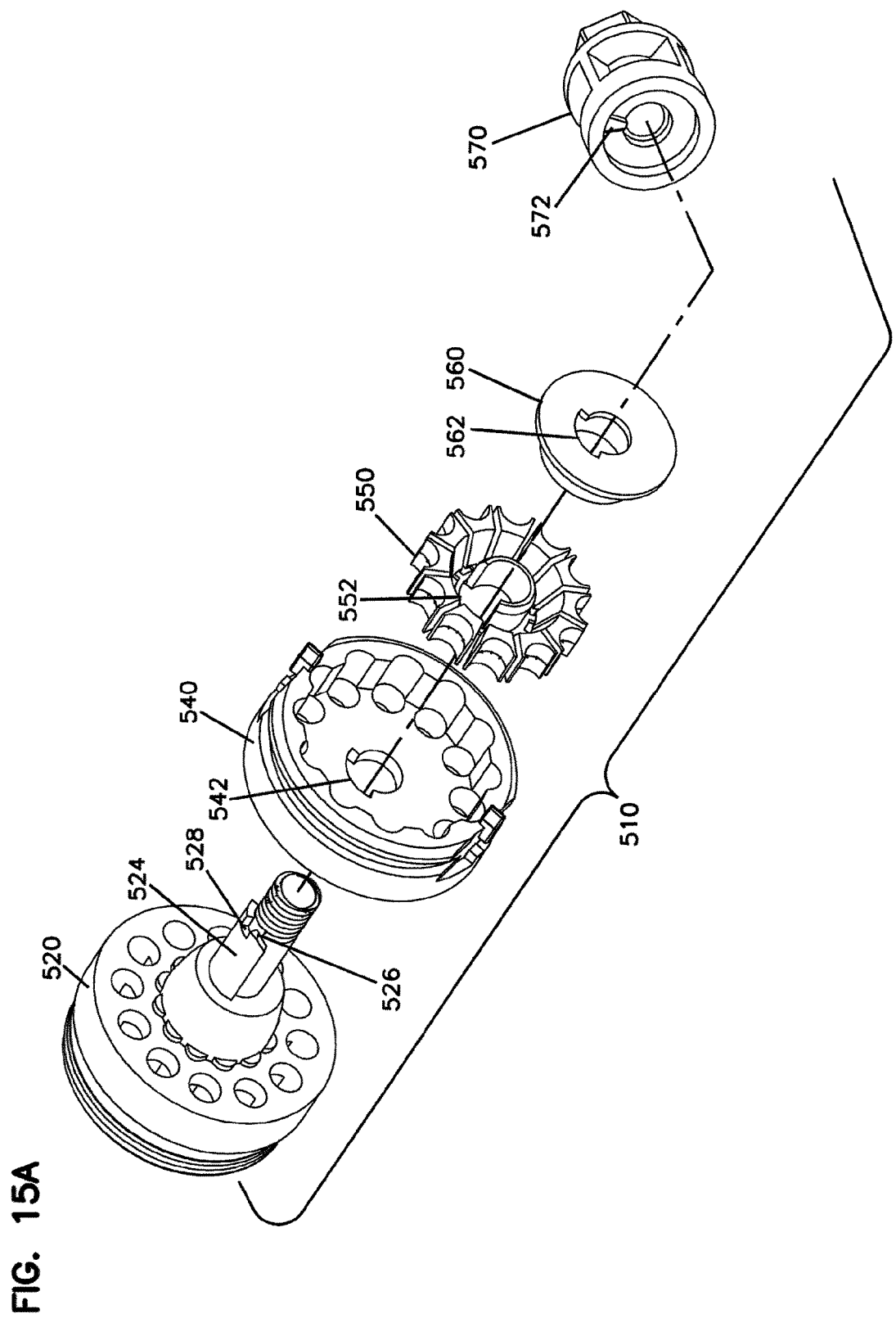
FIG. 15a shows another exploded view of the fixation mechanism of FIG. 13.
Figure 16:
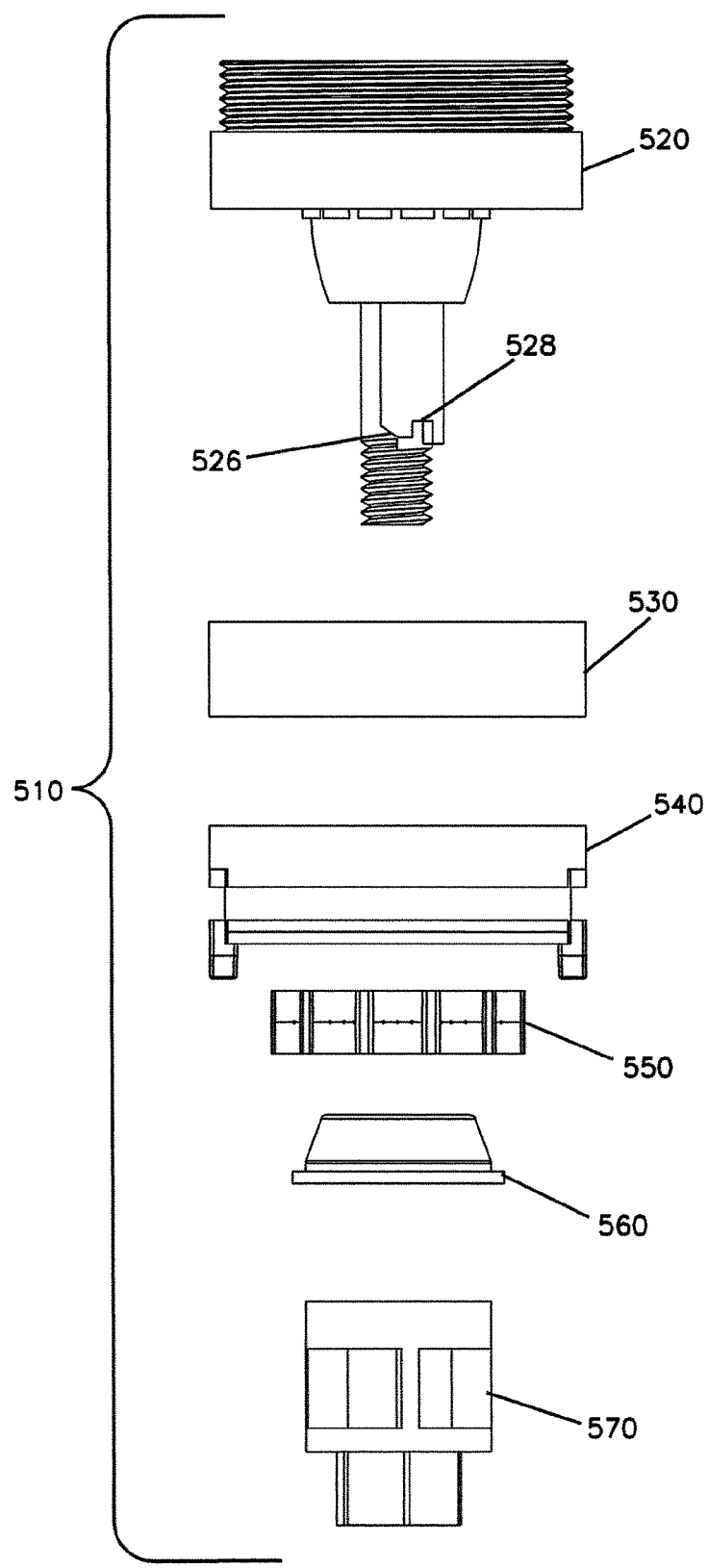
FIG. 16 shows another exploded view of the fixation mechanism of FIG. 13.
Figure 17:
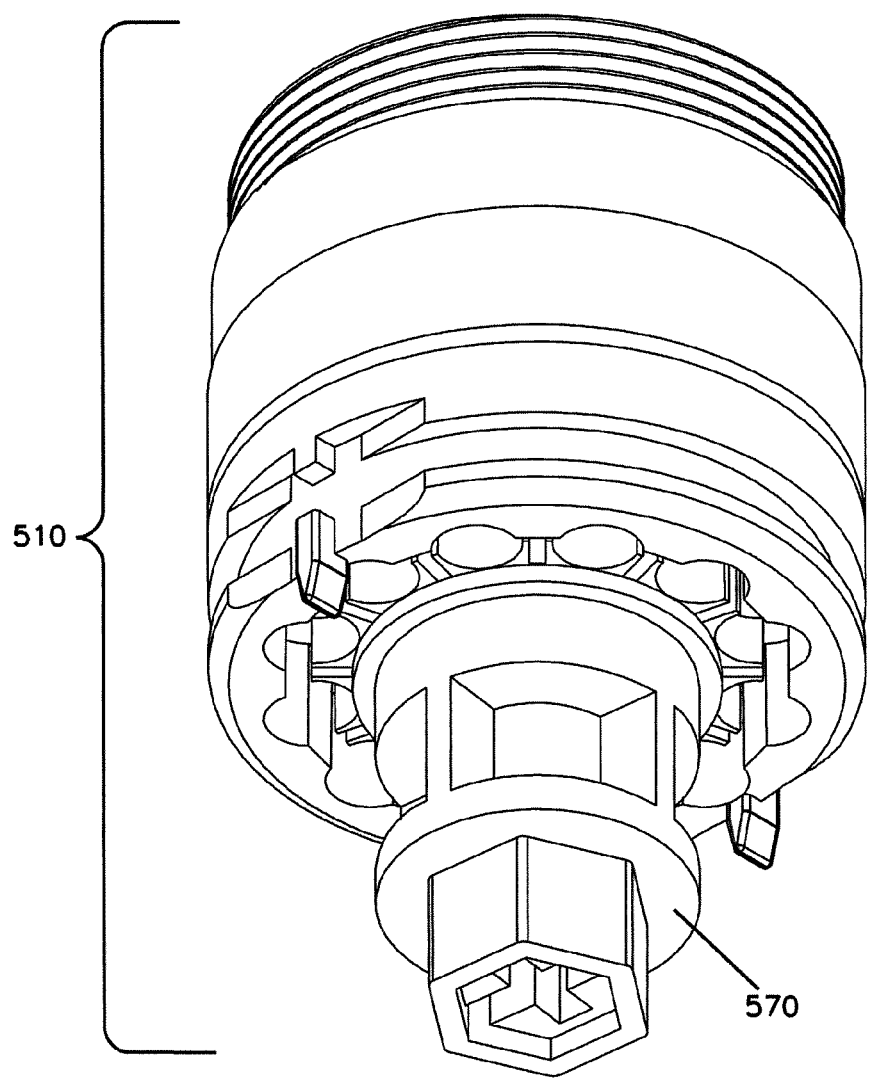
FIGS. 17 and 18 show the tube fixation system of FIGS. 13-16 assembled together.
Figure 18:
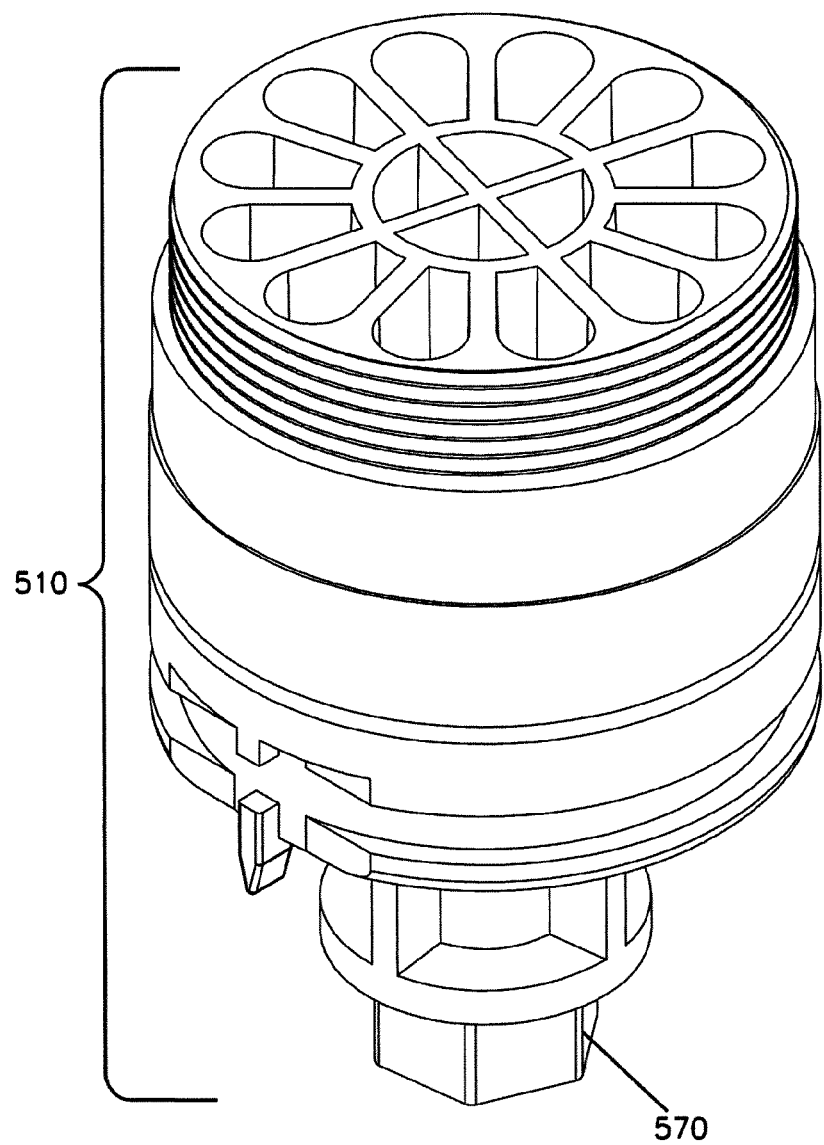
Figure 19:
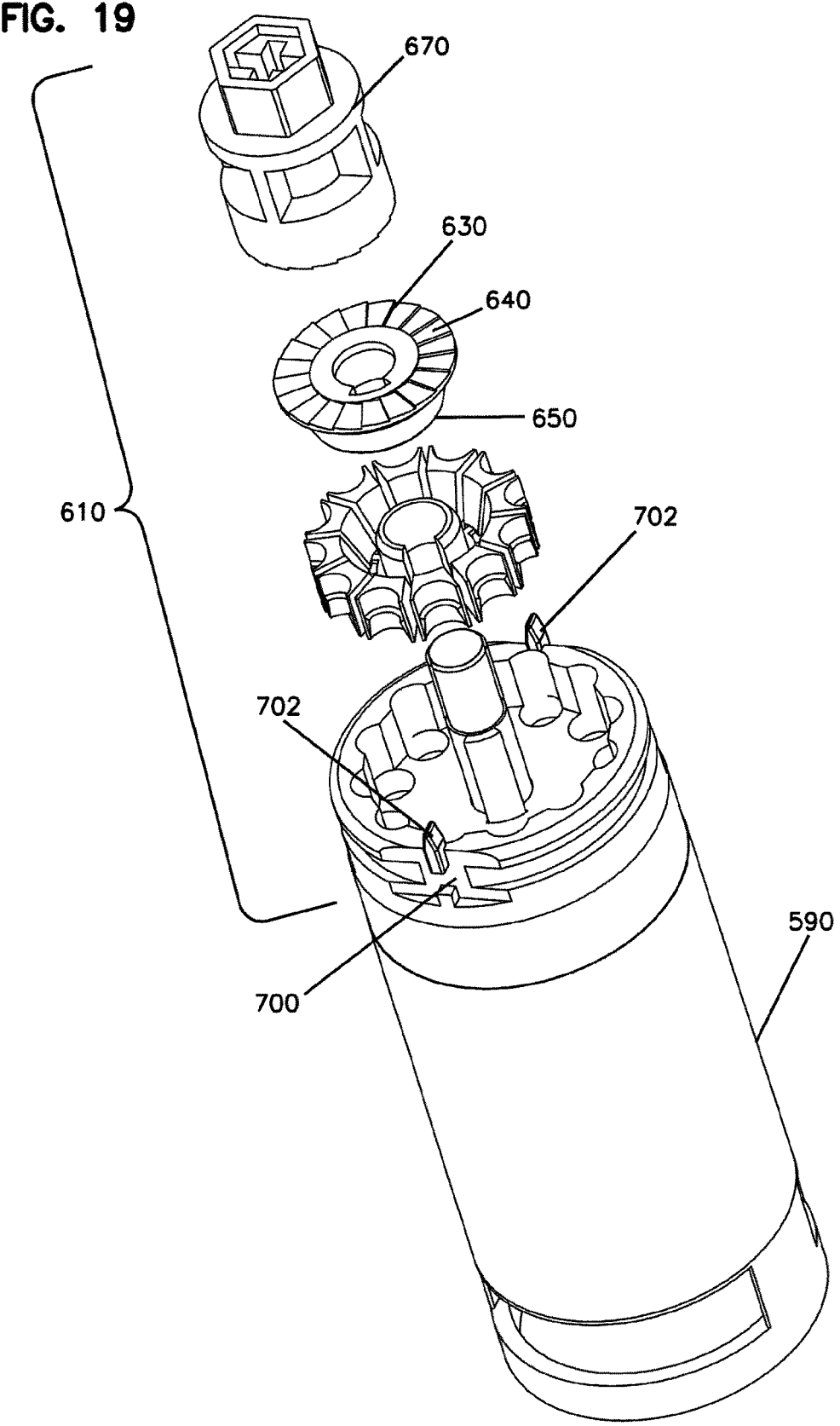
FIGS. 19-23 show a further alternative embodiment of a fixation mechanism.
Figure 20:
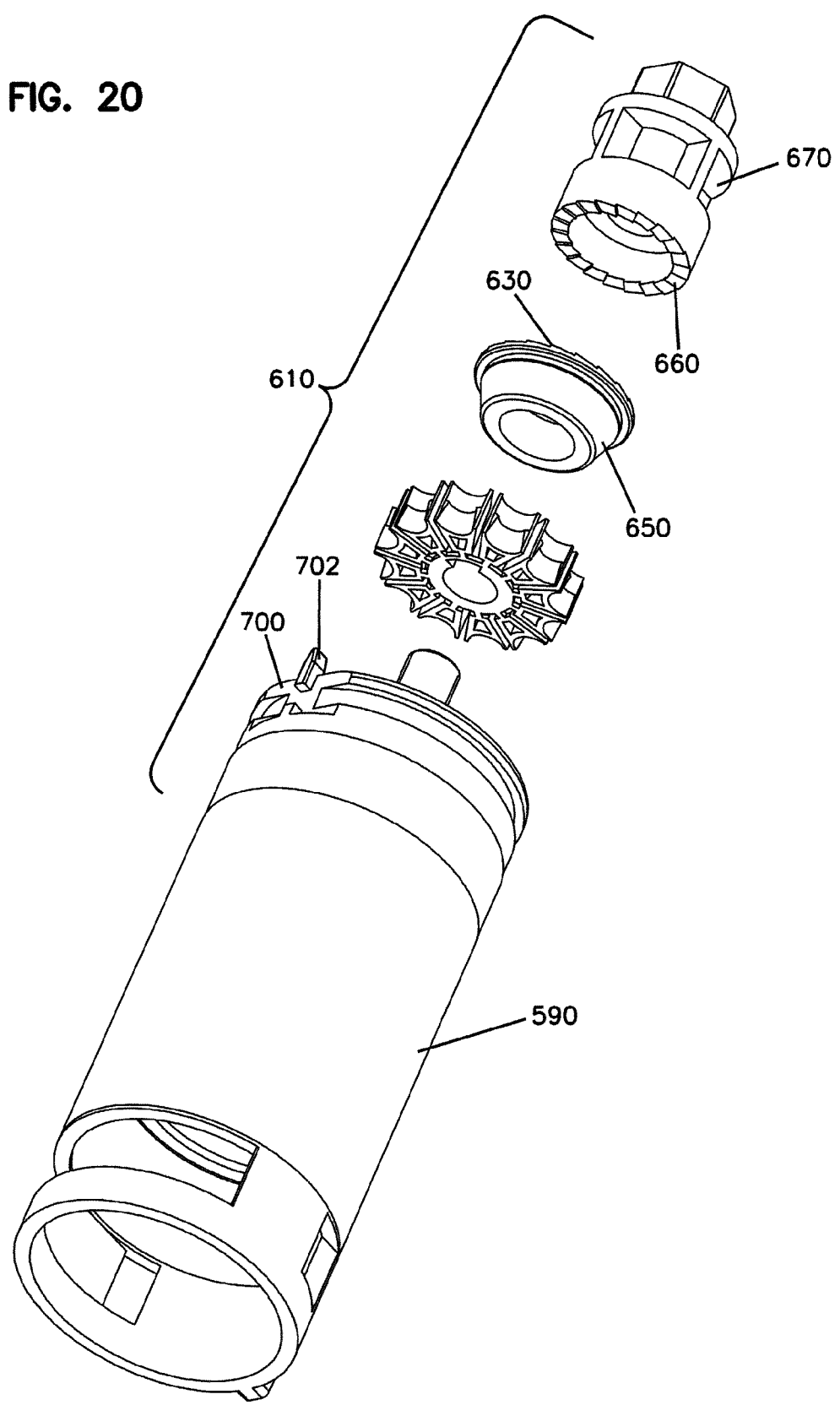
Figure 21:
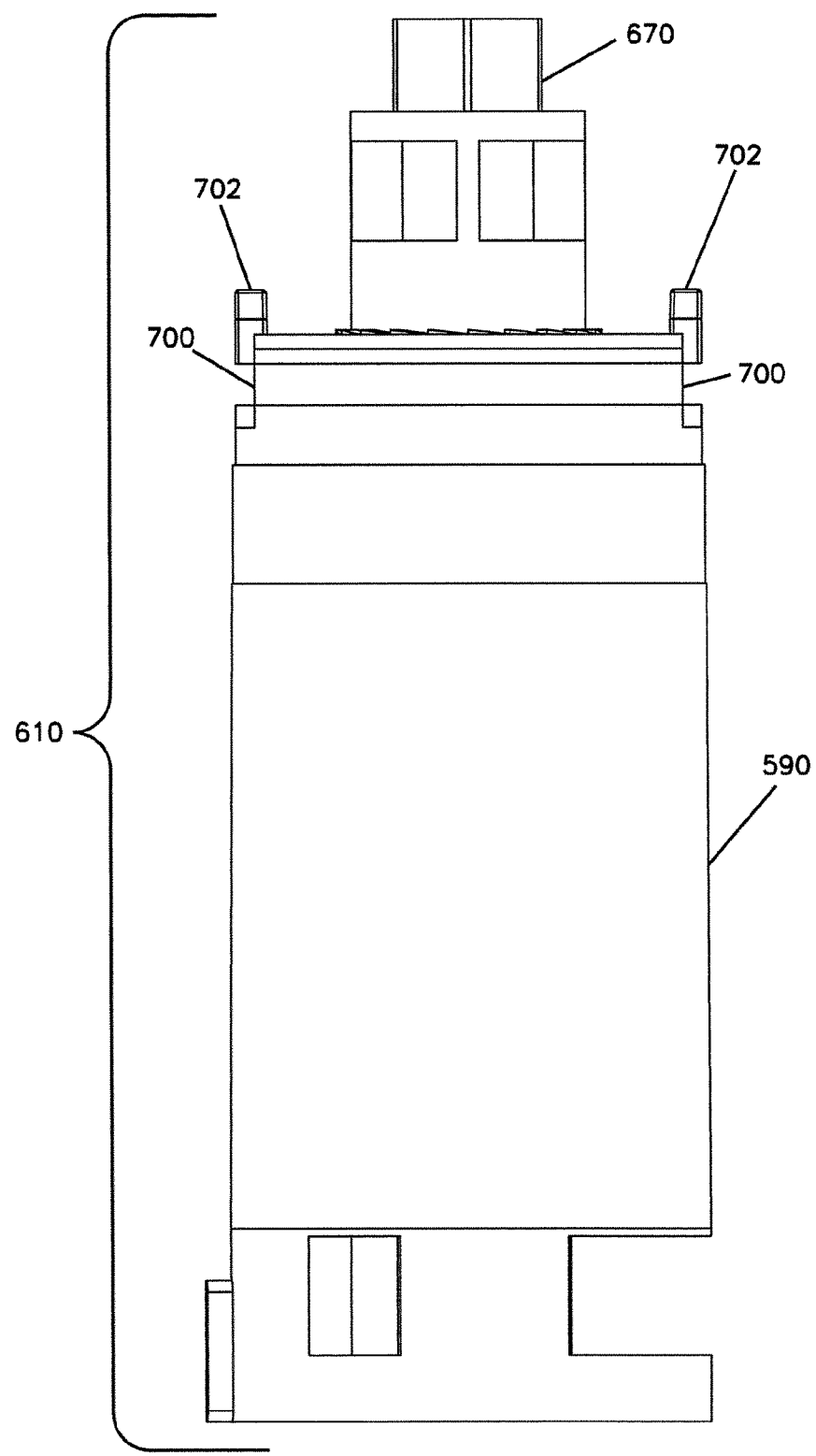
Figure 22:
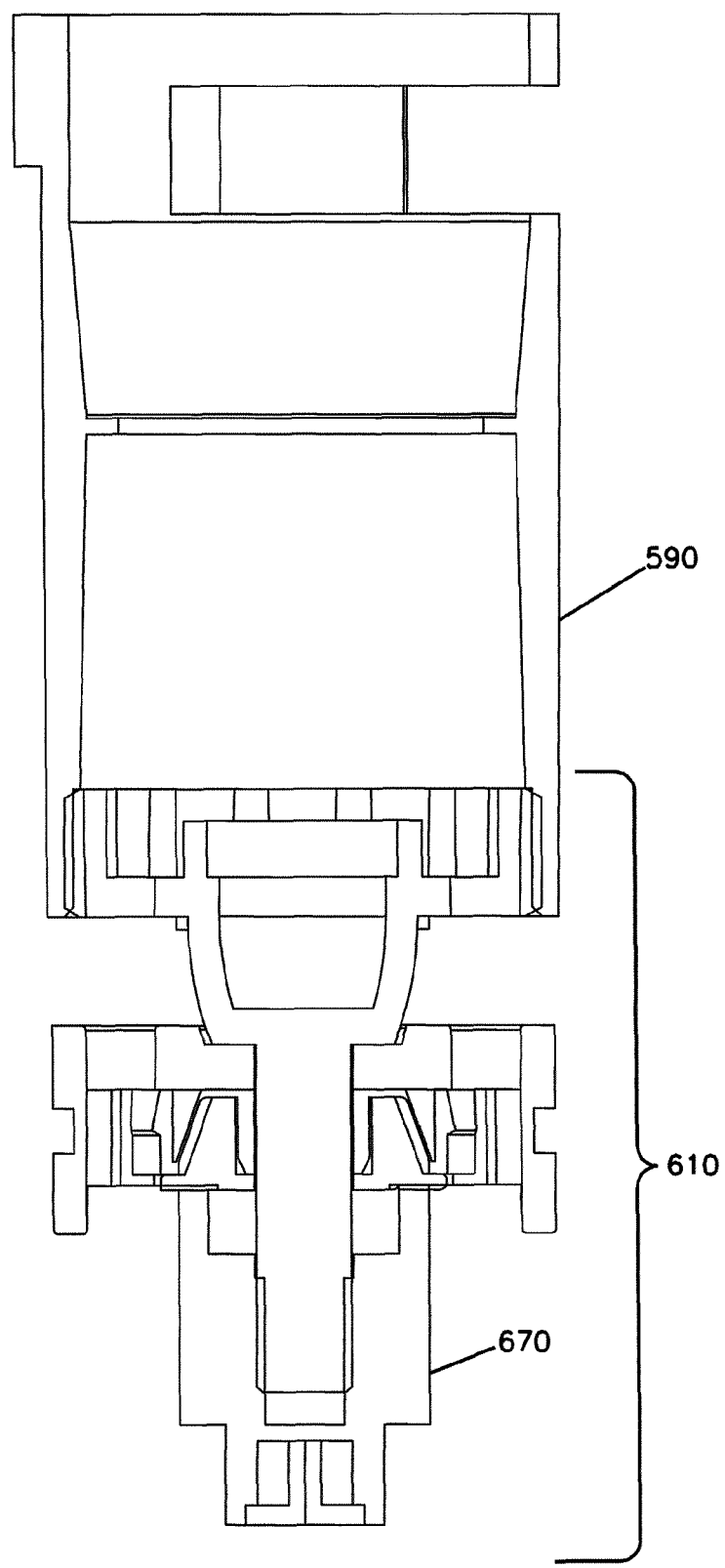
Figure 23:
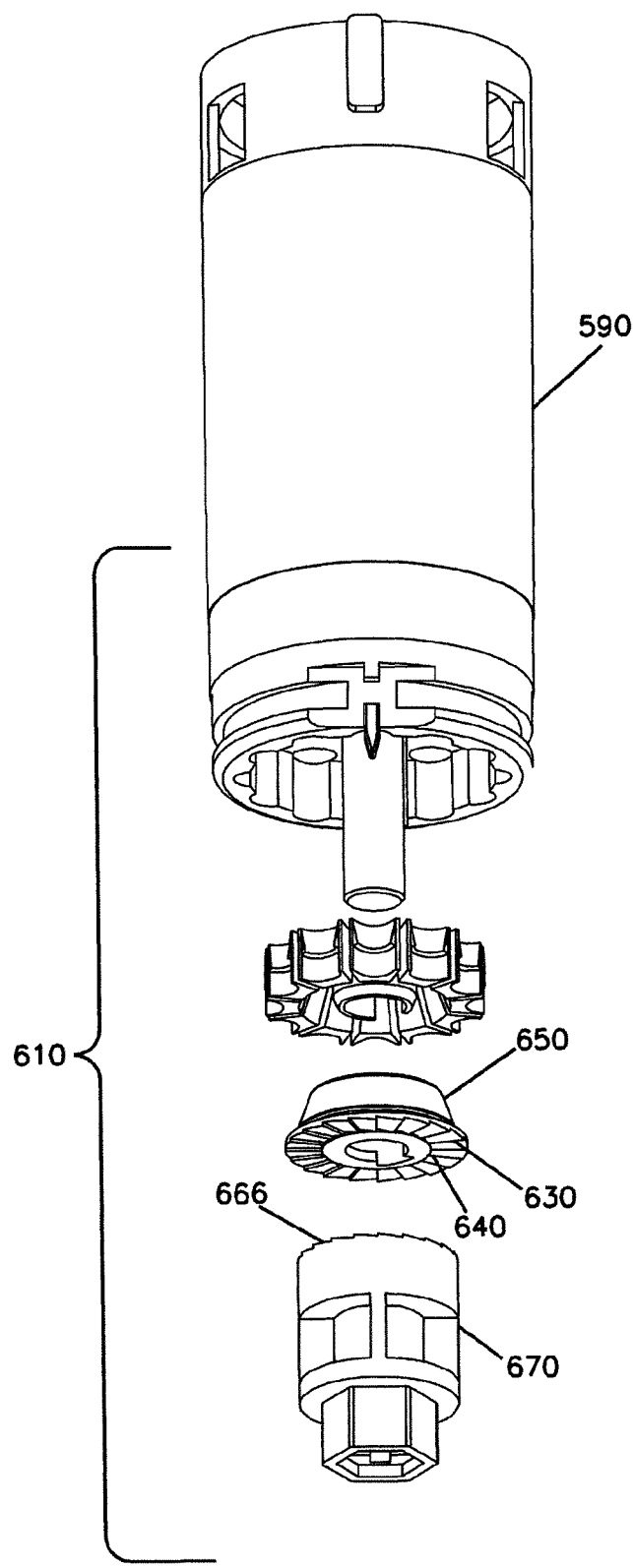

Referring now to FIGS. 11 and 12, an apparatus 310 is shown including a main housing 340 mounted to an end 32 of flex tube 30. Main housing 340 includes an inner seal ring 360 which seals against an outside of flex tube 30. A clip 380 mounts housing 340 to flex tube 30.

A trigger 470 includes a first member 480 which engages inner ring 60 with an angled surface 94. A second member 490 is threadably mounted to a bolt 482. First member 480 is slideably mounted on bolt 482. A spring 496 is positioned between first member 480 and second member 490, around bolt 482. To activate trigger 470, second member 490 is rotated toward first member 480. Spring 496 applies pressure or a biasing force to first member 480. With such a construction, a continual force may be better maintained against blown fiber tubes 20 during use.

Referring now to FIGS. 13-18, an apparatus 510 is shown for fixating tubes and includes an outer flange 520, a sealing disk 530, an inner flange 540, a fixation disk 550, a cone 560, and a trigger 570.

Apparatus 510 includes anti-rotation features between outer flange 520, and inner flange 540, fixation disk 550, and cone 560. Outer flange 520 includes a rail 524 which is received in slot 542 of inner flange 540 and slot 552 of fixation disk 550. Rail 524 is also received in slot 562 of cone 560. Rail 524 also defines a ramp 526 and an axial slot 528. Trigger 570 includes a projection 572. Trigger 570 threadably mounts to shaft 580. Projection 572 follows ramp 526 and falls into slot 528, thereby locking trigger 570 to outer flange 520.

Trigger 570 is threadedly mounted to outer flange 520. Trigger 570 pushes cone 560 into fixation disk 550 to activate the disk. Sealing disk 530 is also activated through the movement of trigger 570.

Referring now to FIGS. 19-23, an alternative apparatus 610 includes some similar features to apparatus 510. Alternative locking mechanism includes ratchet shaped teeth 630 on an end face 640 of cone 650 with mating ratchet shaped teeth 660 on trigger 670.

Apparatus 610 is shown mounted to housing 590. Apparatus 510 threadably mounts to a similar housing 590.

Each of apparatus 510, 610 includes anti-rotation features when mounted to a circular port of an enclosure. As shown, anti-rotation features include flats 700 and tabs 702.

PARTS LIST

10 Apparatus
20 Blown fiber tubes
30 Flex tube
32 End of flex tube
40 Main housing
42 End
50 Outer ring
52 Pockets
54 Base
56 Lip
58 Center hole
60 Inner ring
62 Outer periphery
64 Outer portions
66 Inner portions
68 Pockets
70 Trigger
72 Break lines
80 Socket
82 Bolt
84 Head
90 Angled surface
94 Angled surface
96 Protrusion 98 Slot
100 Port
120 Enclosure
126 C-clip
128 Groove
130 Seal
132 Holes
134 O-ring
140 Inner housing portion
150 Flange
160 Inner ring
168 Pockets
170 Dome shaped middle
198 Slots
200 Flex tube seal and attachment arrangement
310 Apparatus
340 Main housing
360 Inner seal ring
380 Clip
470 Trigger
480 First member
482 Bolt
490 Second member
496 Spring
510 Apparatus
520 Outer flange
524 Rail
526 Ramp
528 Slot
530 Sealing disk
540 Inner flange
542 Slot
550 Fixation disk
552 Slot
560 Cone
562 Slot
570 Trigger
572 Projection
580 Shaft
610 Apparatus
630 Teeth
640 End face
650 Cone
660 Teeth
670 Cone
690 Housing
700 Flats
702 Projection

The invention claimed is:

1. An apparatus for mounting blown fiber tubes, the apparatus comprising:
a main housing mountable to an end of a flex tube;
an outer ring positioned at an end of the main housing;
an inner ring positioned adjacent to and within the outer ring, the inner ring including a center portion and a plurality of outer portions coupled to and surrounding the center portion, the inner ring further including a plurality of slots extending radially from the center portion to separate the plurality of outer portions, wherein the blown fiber tubes are positioned about an outer periphery of the inner ring; and
a trigger which pushes the outer portions of the inner ring to compress the blown fiber tubes between the outer portions of the inner ring and the outer ring, wherein the outer portions of the inner ring break free from the center portion when the trigger pushes the outer portions to compress the blown fiber tubes.

2. The apparatus of claim 1, wherein the outer ring includes a plurality of spaced pockets.

3. The apparatus of claim 1, wherein the inner ring includes a plurality of spaced pockets.

4. The apparatus of claim 3, wherein the plurality of spaced pockets of the inner ring include at least one protrusion.

5. The apparatus of claim 1, wherein the trigger includes first and second threaded members, and wherein the first threaded member includes a surface angled with respect to a longitudinal axis of apparatus, and the inner ring includes a mating angled surface which pushes the inner ring outwardly.

6. The apparatus of claim 1, wherein the trigger includes a first member with an angled surface with respect to a longitudinal axis of apparatus, and the inner ring includes a mating angled surface, which pushes the inner ring outwardly, and wherein the trigger includes a second member threadably mounted to a third member, and a spring positioned between the first member and the second member, wherein the second member pushes on the spring which pushes on the first member.

7. The apparatus of claim 1, wherein the apparatus is mounted to a port for passing cables through the blown fiber tubes.

8. The apparatus of claim 7, wherein the apparatus is mounted to a port in an enclosure for passing cables through the blown fiber tubes into an interior of enclosure.

9. The apparatus of claim 1, further comprising a rotation limiting device to prevent relative rotation between the inner ring and the outer ring.

10. The apparatus of claim 1, further comprising a lock feature between the trigger and another portion of the apparatus to prevent the trigger from releasing.

11. The apparatus of claim 1, further comprising a spring associated with trigger.

12. The apparatus of claim 1, wherein the trigger has an angled surface that is angled with respect to a longitudinal axis of the apparatus and wherein each of the plurality of outer portions has a rigid mating angled surface that when compressed by the trigger causes each of the plurality of outer portions of the inner ring to move toward the outer ring.

13. The apparatus of claim 1, wherein the trigger includes a first member with an angled surface with respect to a longitudinal axis of the apparatus, and the inner ring includes a mating angled surface, wherein the angled surface of the first member pushes against the mating angled surface of the inner ring to exert a radial pressure against the outer portions of the inner ring.

14. The apparatus of claim 1, wherein the outer ring includes an uninterrupted outer circumference defining a center portion of the outer ring, wherein blown fiber tubes are insertable through the center portion of the outer ring.

15. The apparatus of claim 1, wherein the trigger includes a socket and a bolt, and wherein threading of the socket onto the bolt causes the socket to push the outer portions of the inner ring.

16. An apparatus for mounting blown fiber tubes, the apparatus comprising:
a main housing mountable to an end of a flex tube;
an outer ring positioned at an end of the main housing;
an inner ring positioned adjacent to and within the outer ring, the inner ring including a center portion and a plurality of outer portions coupled to and surrounding the center portion, each of the outer portions including an angled surface that is angled with respect to a longitudinal axis of the apparatus, the inner ring further including a plurality of slots extending radially from the center portion to separate the plurality of outer portions, wherein the blown fiber tubes are positioned about an outer periphery of the inner ring; and a trigger that includes a first member with an angled surface that is angled with respect to the longitudinal axis of the apparatus, the angled surface of the first member mating with the angled surface of the outer portions to exert a radial pressure against the outer portions enabling the inner ring to compress the blown fiber tubes between the outer portions of the inner ring and the outer ring.

* * * * *